March 10, 1936. C. HELIN 2,033,829
FISH LURE
Filed Oct. 2, 1934
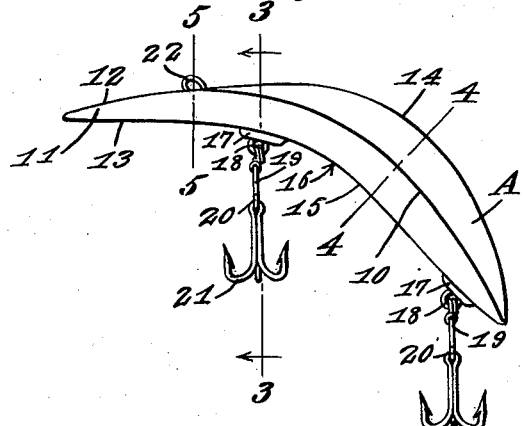
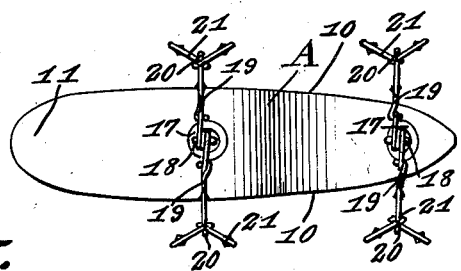
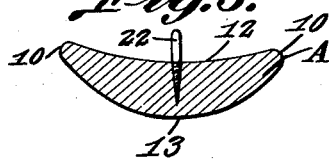
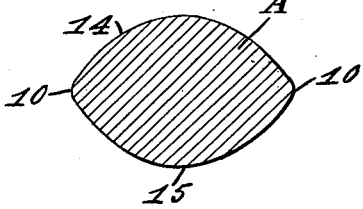
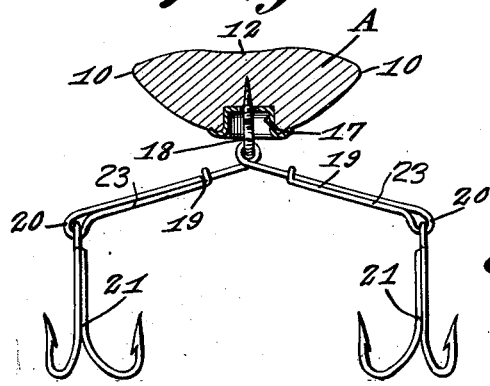
Charles Helin, INVENTOR
BY Victor J. Evans & Co.
ATTORNEY Patented Mar. 10, 1936

2,033,829

UNITED STATES PATENT OFFICE 2,033,829

FISH LURE

Charles Helin, Detroit, Mich.

Application October 2, 1934, Serial No. 746,573

1 Claim. (Cl. 43—46)

The invention relates to a lure and more particularly to a fish lure or artificial casting and trolling minnow.

The primary object of the invention is the provision of a lure of this character, wherein the body thereof is streamlined, making minimum resistance to the water, and has an edge running laterally the length thereof for assuring a minimum of lateral resistance in the activity of the body during wobbling or lateral action, the lateral resistance combined with the head resistance of the body as produced by an arched formation of the same, the said lure yields more action or wobble when drawn through the water and this action is enhanced by the resistance or backing produced by the rearmost end portion of the head of the said lure.

Another object of the invention is the provision of a lure of this character, wherein the body thereof carries hooks, these being mounted or arranged in a novel manner so as to be effective for hooking game fish when the same strike the lure, and especially when the game fish strike without much vigor, the said hooks being adapted for easy penetration, and by reason of the disposition of such hooks offset from the body, the fish find it more difficult to obtain a purchase on the body of the lure by which they could more easily eject the hooks.

A further object of the invention is the provision of a lure of this character, wherein the body formation thereof is of novel kind to assure a maximum of action and is lifelike when being drawn through the water, the lure being especially designed for attractiveness to game fish, such as black bass, and the attractiveness lying in the life-like and erratic movement of said body through the water.

A still further object of the invention is the provision of a lure of this character which is simple in construction, thoroughly reliable and efficient in its purpose, readily and easily handled, strong, durable, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:

Figure 1 is a perspective view of the lure constructed in accordance with the invention.

Figure 2 is a bottom plan view thereof.

Figure 3 is an enlarged fragmentary sectional view on the line 3—3 of Figure 1 looking in the direction of the arrows.

Figure 4 is a sectional view on the line 4—4 of Figure 1.

Figure 5 is a sectional view on the line 5—5 of Figure 1.

Similar reference characters indicate corresponding parts throughout the several views in the drawing.

Referring to the drawing in detail, the lure comprises a body A formed with opposite lateral edges 10 extending for the length thereof and having a head 11 with a concaved upper surface 12 and a convexed lower surface 13, while merging with this upper surface at the trailing or rear portion of the body is the curved upper portion 14, and likewise merging with the surface 13 is the curved lower portion 15. The body is upwardly arched, as at 16, in the direction of its length.

Countersunk in the under face of the body A at the longitudinal median thereof, preferably close to the rear end and rearwardly of the head, are socketed eyes 17 through which are passed eye screws 18 loosely supporting double arm hangers 19, the arms being extended beyond opposite sides of the body A and disposed in downwardly divergent relation to each other and having suspended from their loop ends 20 treble hooks 21, these being small in kind to penetrate more easily than larger treble hooks.

It is, of course, understood that the body A of the lure may be colored or otherwise decorated.

Mounted in the head 11 and projected from the concaved surface 12, centrally with respect to said head, is a screw 22 for the attachment of a fishing line therewith.

It will be apparent that the treble hooks 21 are arranged in pairs and one pair is suspended from the bottom front center of the body A and the other pair is suspended from the bottom rear center or the very rear of the lure.

In the use of the artificial minnow or lure, it should be apparent that minimum resistance is offered by the body A to the water in the lure's lateral action or wobble and this minimum resistance combined with the head resistance produced by the arched formation of the body assures or yields more action or wobble when the lure is drawn through the water. Further, this action is enhanced by the resistance of vacuum produced by the flat, or comparatively flat, rear portion of the head 11, it being preferable to have the lure made from wood, with the grain thereof running parallel with the tip of the said lure.

It is, of course, understood that in lieu of the treble hooks 21, single hooks may be suspended by the hangers 19.

The loop ends 20 are opened and closed by spring latch arms 23 and the purpose of the said arms is to permit of a quick changing of hooks in the event that the original hooks become broken or damaged and unfit for use. These arms 23 are snapped into engagement with the diverging portions of the hangers 19 and thus a snap arm action may be had for placement of hooks upon the hangers.

The lure is in effect an artificial minnow and is used in casting and trolling for game fish, black bass and the like, and the essentials in the structural make-up lie in the arrangement of hangers upon the body, so that the hooks will be loosely suspended beyond opposite sides of the body of the lure so as to be effective in hooking a game fish when it strikes the lure, particularly when the game fish strikes without much vigor and difficulty for the fish to obtain a purchase on the body of the lure is had by which such fish could more easily eject the hook, while the formation of the body of such lure is effective for producing a maximum action when in service.

What is claimed is:

A lure of the character described comprising an upwardly arched body having a tapered formation in the direction of its rearmost end and provided with a concavo-convex forward portion constituting a head and an upwardly and downwardly arched trailing portion, the head and trailing portions at their curved surfaces merging into each other, eye members carried by the body at the under side thereof and spaced from each other along the longitudinal median of said body and considerably removed from the head end of the same, laterally spread hangers loosely engaged with said eye members and hooks detachably connected with and loosely suspended from the hangers for disposition beyond the opposite sides of the body.

CHARLES HELIN.